US011126366B2

(12) United States Patent
Yeh

(10) Patent No.: US 11,126,366 B2
(45) Date of Patent: Sep. 21, 2021

(54) DATA ERASING METHOD, MEMORY CONTROL CIRCUIT UNIT AND MEMORY STORAGE DEVICE

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 33 days.

(21) Appl. No.: 16/547,584

(22) Filed: Aug. 22, 2019

(65) Prior Publication Data
US 2021/0004173 A1 Jan. 7, 2021

(30) Foreign Application Priority Data
Jul. 4, 2019 (TW) .................................. 108123642

(51) Int. Cl.
*G06F 3/06* (2006.01)
*G06F 12/02* (2006.01)

(52) U.S. Cl.
CPC .......... *G06F 3/0652* (2013.01); *G06F 3/0608* (2013.01); *G06F 3/0658* (2013.01); *G06F 3/0679* (2013.01); *G06F 12/0246* (2013.01)

(58) Field of Classification Search
CPC .. G06F 3/0679; G06F 12/0246; G06F 3/0652; G06F 3/0608; G06F 3/0658; G06F 2212/7201

USPC .................................................. 711/154, 103
See application file for complete search history.

(56) References Cited

U.S. PATENT DOCUMENTS

| 9,001,585 B1 | 4/2015 | Lin et al. | |
|---|---|---|---|
| 2005/0144367 A1* | 6/2005 | Sinclair | G06F 12/0246 711/103 |
| 2007/0113030 A1* | 5/2007 | Bennett | G11C 16/16 711/159 |
| 2010/0228928 A1* | 9/2010 | Asnaashari | G06F 12/0246 711/154 |
| 2015/0293809 A1* | 10/2015 | Liang | G06F 11/076 714/704 |
| 2016/0124668 A1* | 5/2016 | Inbar | G06F 12/0246 711/162 |
| 2018/0357159 A1* | 12/2018 | Parker | G06F 3/0688 |

* cited by examiner

*Primary Examiner* — Hashem Farrokh
(74) *Attorney, Agent, or Firm* — JCIPRNET

(57) ABSTRACT

A data erasing method, a memory control circuit unit and a memory storage device are provided. The method includes selecting a first physical erasing unit group from a plurality of physical erasing unit groups, and performing an erase operation to the first physical erasing unit group, wherein the first physical erasing unit group includes a plurality of first physical erasing units, and the number of at least one second physical erasing unit used to perform the erasing operation at the same time point of the plurality of first physical erasing units is different from the number of the plurality of first physical erasing units.

24 Claims, 11 Drawing Sheets

```
Select a first physical erasing unit group
from a plurality of physical erasing unit  ── S701
groups
        │
        ▼
Perform an erase operation for the first
physical erasing unit group, where the
first physical erasing unit group
comprises a plurality of first physical
erasing units, and the number of second  ── S703
physical erasing units used to perform
the erase operation at the same time
point of the first physical erasing units
is different from the number of the first
physical erasing units
```

FIG. 8A

| | 410(0) | | 420(0) | | 430(0) | | 440(0) |
|---|---|---|---|---|---|---|---|
| 1 | | 1 | | 1 | | 1 | |
| 2 | | 2 | | 2 | | 2 | |
| 3 | | 3 | | 3 | | 3 | |
| 4 | | 4 | | 4 | | 4 | |

FIG. 8B

| | 410(1) | | 420(1) | | 430(1) | | 440(1) |
|---|---|---|---|---|---|---|---|
| 1 | OD1 | 1 | OD2 | 1 | OD3 | 1 | OD4 |
| 2 | OD5 | 2 | OD6 | 2 | OD7 | 2 | OD8 |
| 3 | OD9 | 3 | OD10 | 3 | OD11 | 3 | OD12 |
| 4 | OD13 | 4 | OD14 | 4 | OD15 | 4 | OD16 |

| | 410(0) | | 420(0) | | 430(0) | | 440(0) |
|---|---|---|---|---|---|---|---|
| 1 | ND1 | 1 | ND2 | 1 | ND3 | 1 | ND4 |
| 2 | | 2 | | 2 | | 2 | |
| 3 | | 3 | | 3 | | 3 | |
| 4 | | 4 | | 4 | | 4 | |

FIG. 9A

| | 410(1) | | 420(1) | | 430(1) | | 440(1) |
|---|---|---|---|---|---|---|---|
| 1 | | 1 | OD2 | 1 | OD3 | 1 | OD4 |
| 2 | | 2 | OD6 | 2 | OD7 | 2 | OD8 |
| 3 | | 3 | OD10 | 3 | OD11 | 3 | OD12 |
| 4 | | 4 | OD14 | 4 | OD15 | 4 | OD16 |

410(1): (empty)
420(1): (empty)
430(1): 1: OD3, 2: OD7, 3: OD11, 4: OD15
440(1): 1: OD4, 2: OD8, 3: OD12, 4: OD16

| 1 | ND1 |
| 2 | ND5 |
| 3 | ND9 |
| 4 | ND13 |

410(0)

| 1 | ND2 |
| 2 | ND6 |
| 3 | ND10 |
| 4 | ND14 |

420(0)

| 1 | ND3 |
| 2 | ND7 |
| 3 | ND11 |
| 4 | ND15 |

430(0)

| 1 | ND4 |
| 2 | ND8 |
| 3 | ND12 |
| 4 | ND16 |

| 1 | |
| 2 | |
| 3 | |
| 4 | |

410(1)

| 1 | |
| 2 | |
| 3 | |
| 4 | |

420(1)

| 1 | |
| 2 | |
| 3 | |
| 4 | |

430(1)

| 1 | |
| 2 | |
| 3 | |
| 4 | |

| | 410(1) | | 420(1) | | 430(1) | | 440(1) |
|---|---|---|---|---|---|---|---|
| 1 | ID1 | 1 | ID2 | 1 | ID5 | 1 | ID6 |
| 2 | ID3 | 2 | ID4 | 2 | | 2 | |
| 3 | | 3 | ID7 | 3 | | 3 | |
| 4 | | 4 | ID8 | 4 | | 4 | |

FIG. 13

DATA ERASING METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 108123642, filed on Jul. 4, 2019. The entirety of the above-mentioned patent application is hereby incorporated by reference herein and made a part of this specification.

BACKGROUND OF THE INVENTION

1. Field of the Invention

The present invention relates to a data erasing method, a memory control circuit unit and a memory storage device.

2. Description of Related Art

With the rapid development of digital cameras, mobile phones and MP3 players in recent years, the demand of customers on storage media also rapidly increases. With the characteristics of data non-volatility, electricity saving, small size, no mechanical structures, etc., rewritable non-volatile memory modules (such as the flash memory) are highly suitable for being built in the various portable multimedia devices as examples mentioned above.

In general, a rewritable non-volatile memory module may comprise a plurality of memory sub-modules. In order to increase the efficiency of write, a memory management circuit will generally write data into the aforementioned memory sub-modules via a plurality of data buses in parallel. In the process of parallel write, if the quantity of the data to be written is just equal to the capacity to store data of a physical erasing unit group, every physical erasing unit of the physical erasing unit group will generally be filled up with the data simultaneously at a certain time point.

If the memory management unit needs to perform an erase operation for the physical erasing unit of the aforementioned physical erasing unit group for some reason later (for example, perform valid data merging or other operations), the memory management circuit will generally perform the erase operation for the plurality of physical erasing units of the physical erasing unit group simultaneously. That is, in the prior art, in order to keep the efficiency of parallel write, erase operation is generally performed with a physical erasing unit group as a unit to clear the space of the physical erasing unit group for subsequent parallel write.

In the case of a physical erasing unit group comprising a physical erasing unit in each memory sub-module, when erase operation is performed with the physical erasing unit group as a unit, because all the memory sub-modules in the rewritable non-volatile memory are used to perform the erase operation, if a host system issues a plurality of write instructions in succession at this moment, then data coming from the host system cannot be written into the rewritable non-volatile memory but need to be temporarily stored into a buffer memory. However, because of the limited space of the buffer memory, the longer the execution time of the erase operation is, under the condition of the host system issuing write instructions in succession, the larger capacity the buffer memory is required to have in order to temporarily store data coming from the host system. Therefore, how to avoid the problem caused by all the memory sub-modules in the rewritable non-volatile memory being simultaneously used to perform the erase operation is one of the problems which those skilled in the art want to solve.

SUMMARY OF THE INVENTION

The present invention provides a data erasing method, a memory control circuit unit and a memory storage device, which do not need to use a buffer memory with large capacity, and avoid the problem caused by all memory sub-modules in a rewritable non-volatile memory being simultaneously used to perform an erase operation.

The data erasing method provided by the present invention is applied to a rewritable non-volatile memory module. The rewritable non-volatile memory module includes a plurality of physical erasing unit groups, and each of the plurality of physical erasing unit groups is provided with a plurality of physical erasing units. The data erasing method includes: selecting a first physical erasing unit group from the plurality of physical erasing unit groups; and performing an erase operation for the first physical erasing unit group. The first physical erasing unit group includes a plurality of first physical erasing units, and the number of at least one second physical erasing unit used to perform the erase operation at the same time point of the plurality of first physical erasing units is different from the number of the plurality of first physical erasing units.

The memory control circuit unit provided by the present invention is configured to control a rewritable non-volatile memory module. The rewritable non-volatile memory module comprises a plurality of physical erasing unit groups, each of the plurality of physical erasing unit groups is provided with a plurality of physical erasing units, and the memory control circuit unit includes a host interface, a memory interface and a memory management circuit. The host interface is configured to be coupled to a host system. The memory interface is configured to be coupled to the rewritable non-volatile memory module. The memory management circuit is coupled to the host interface and the memory interface, and is configured to perform the following operation: selecting a first physical erasing unit group from the plurality of physical erasing unit groups; and performing an erase operation for the first physical erasing unit group. The first physical erasing unit group includes a plurality of first physical erasing units, and the number of at least one second physical erasing unit used to perform the erase operation at the same time point of the plurality of first physical erasing units is different from the number of the plurality of first physical erasing units.

The memory storage device provided by the present invention includes a connecting interface unit, a rewritable non-volatile memory module and a memory control circuit unit. The connecting interface unit is configured to be coupled to a host system. The rewritable non-volatile memory module includes a plurality of physical erasing unit groups, and each of the plurality of physical erasing unit groups is provided with a plurality of physical erasing units. The memory control circuit unit is coupled to the connecting interface unit and the rewritable non-volatile memory module, and is configured to perform the following operation: selecting a first physical erasing unit group from the plurality of physical erasing unit groups; and performing an erase operation for the first physical erasing unit group. The first physical erasing unit group includes a plurality of first physical erasing units, and the number of at least one second physical erasing unit used to perform the erase operation at the same time point of the plurality of first physical erasing units is different from the number of the plurality of first physical erasing units.

Base on the above, in the data erasing method, the memory control circuit unit and the memory storage device of the present invention, as the erase operation will not be performed for all the physical erasing units of one physical erasing unit group at the same time point, not all the memory sub-modules are used to perform the erase operation at the same time point. In this case, when the host system still continues to issue write instructions, data coming from the host system can be written into the rewritable non-volatile memory module instead of being temporarily stored in the buffer memory to wait for the completion of the erase operation. Thereby, the data erasing method of the present invention does not need to use a buffer memory with large capacity, and avoids the problem caused by all the memory sub-modules in the rewritable non-volatile memory being simultaneously used to perform an erase operation.

In order to make the aforementioned and other objectives and advantages of the present invention comprehensible, embodiments accompanied with figures are described in detail below.

BRIEF DESCRIPTION OF THE DRAWINGS

FIG. 8A, FIG. 8B, FIG. 9A, FIG. 9B, FIG. 10A, FIG. 10B, FIG. 11A, FIG. 11B, FIG. 12A and FIG. 12B are schematic diagrams of an example of a data erasing method drawn according to exemplary Embodiment 1 of the present invention.

FIG. 13 is a schematic diagram of an example of a data erasing method drawn according to exemplary Embodiment 2 of the present invention.

DESCRIPTION OF THE EMBODIMENTS

In general, a memory storage device (also called a memory storage system) includes a rewritable non-volatile memory module and a controller (also called a control circuit). Generally, the memory storage device is used along with a host system, so that the host system can write data into the memory storage device or read data from the memory storage device.

Figure 1:
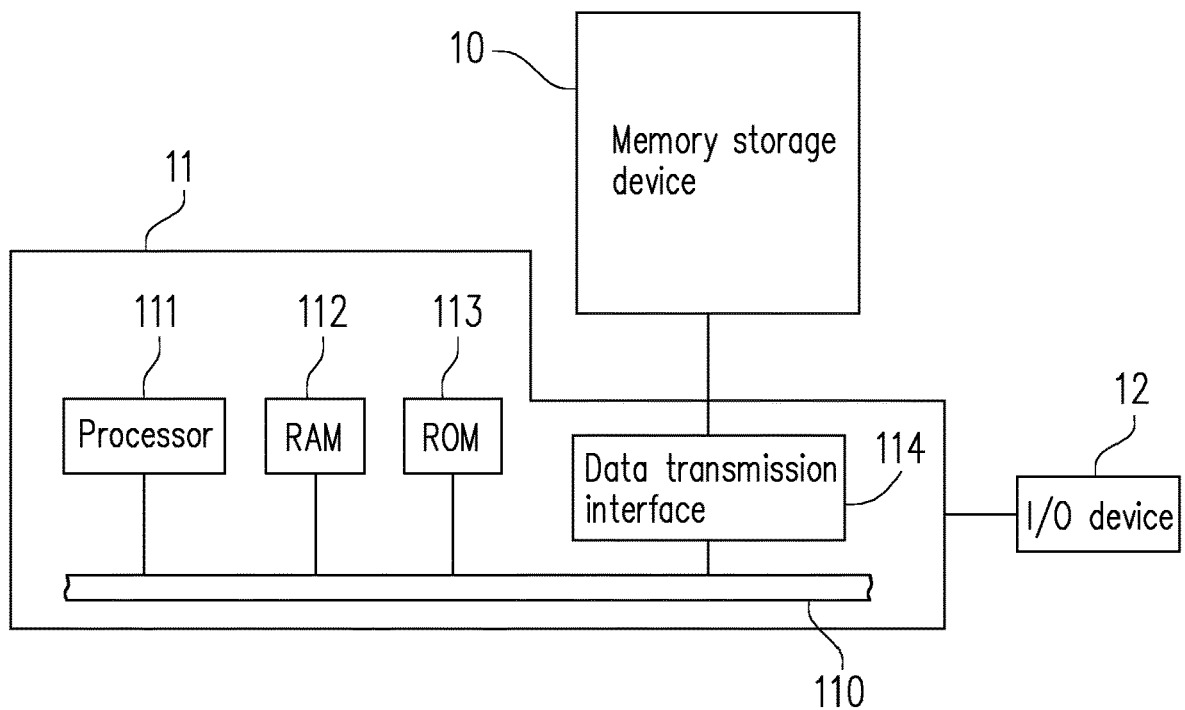
FIG. 1 is a schematic diagram of a host system, a memory storage device and an input/output (I/O) device drawn according to an exemplary embodiment of the present invention.
Figure 2:
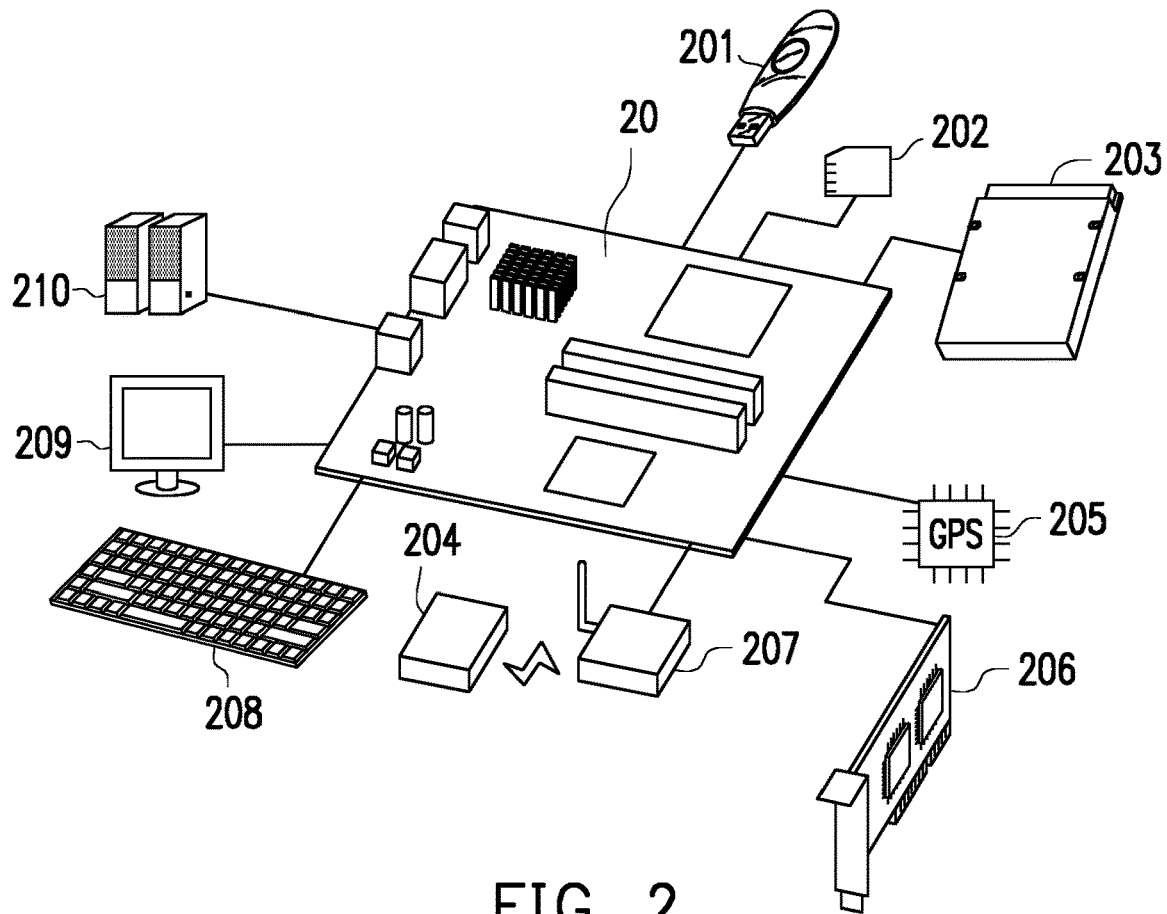
FIG. 2 is a schematic diagram of a host system, a memory storage device and an I/O device drawn according to another exemplary embodiment of the present invention.

FIG. 1 is a schematic diagram of a host system, a memory storage device and an input/output (I/O) device drawn according to an exemplary embodiment of the present invention. FIG. 2 is a schematic diagram of a host system, a memory storage device and an I/O device drawn according to another exemplary embodiment of the present invention.

Refer to FIG. 1 and FIG. 2, the host system 11 generally includes a processor 111, a random access memory (RAM) 112, a read only memory (ROM) 113 and a data transmission interface 114. The processor 111, the random access memory 112, the read only memory 113 and the data transmission interface 114 are all coupled to a system bus 110.

In the present exemplary embodiment, the host system 11 is coupled to a memory storage device 10 through the data transmission interface 114. For example, the host system 11 may store data into the memory storage device 10 or read data from the memory storage device 10 via the data transmission interface 114. In addition, the host system 11 is coupled to an I/O device 12 through the system bus 110. For example, the host system 11 may transmit output signals to the I/O device 12 or receive input signals from the I/O device 12 via the system bus 110.

In the present exemplary embodiment, the processor 111, the random access memory 112, the read only memory 113 and the data transmission interface 114 may be arranged on a mainboard 20 of the host system 11. There may be one or more data transmission interfaces 114. Through the data transmission interface 114, the mainboard 20 may be coupled to the memory storage device 10 in a wired or wireless mode. For example, the memory storage device 10 may be, for example, a USB flash drive 201, a memory card 202, a solid state drive (SSD) 203 or a wireless memory storage device 204. For example, the wireless memory storage device 204 may be, for example, various memory storage devices based on wireless communication technologies, such as a Near Field Communication (NFC) memory storage device, a Wireless Fidelity (WiFi) memory storage device, a Bluetooth memory storage device, a low-power consumption Bluetooth memory storage device (e.g. iBeacon). In addition, the mainboard 20 may also be coupled to various I/O devices (such as a Global Positioning System (GPS) module 205, a network interface card 206, a wireless transmission device 207, a keyboard 208, a screen 209, and a loudspeaker 210) through the system bus 110. For example, in an exemplary embodiment, the mainboard 20 may access the wireless memory storage device 204 via the data transmission interface 207.

Figure 3:
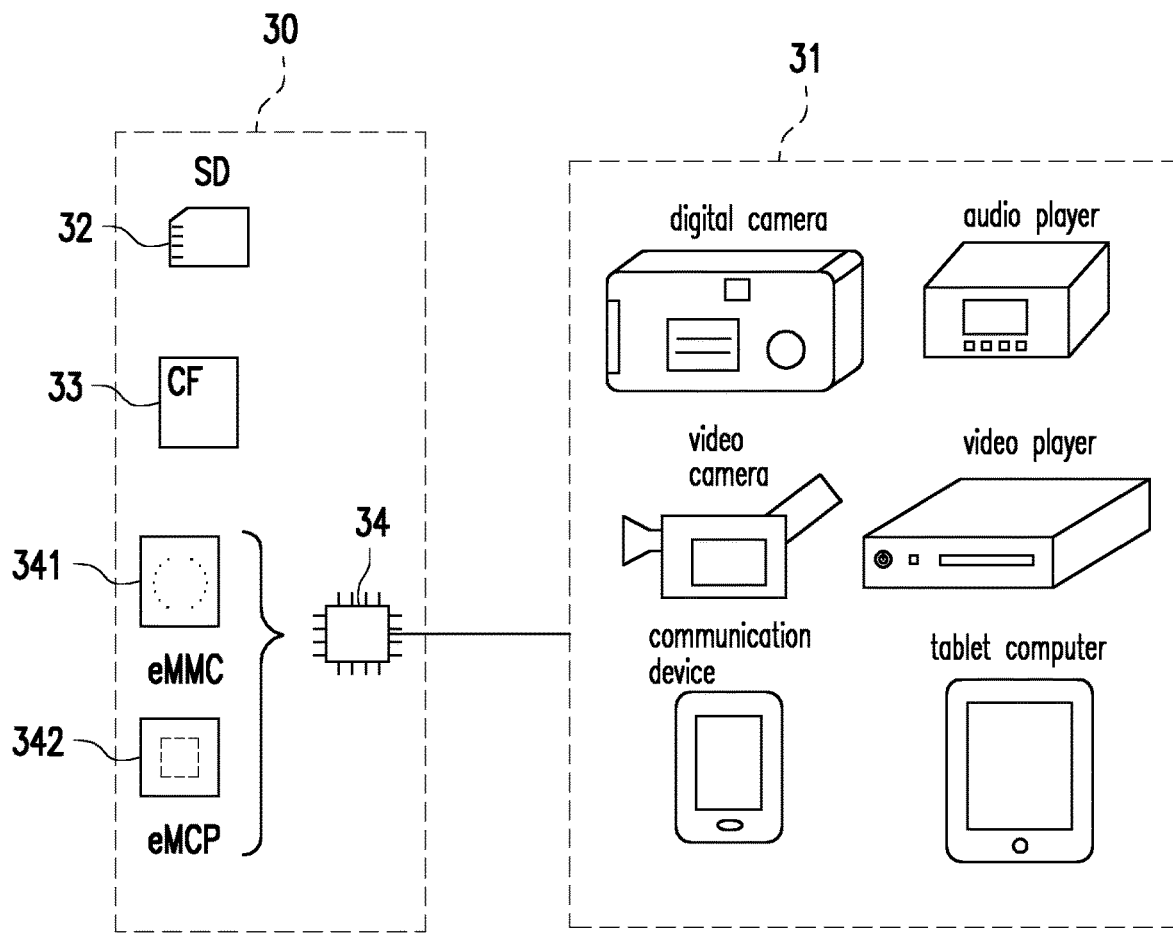
FIG. 3 is a schematic diagram of a host system and a memory storage device drawn according to another exemplary embodiment of the present invention.

In an exemplary embodiment, the provided host system may be any system which substantially cooperates with the memory storage device to store data. Although the host system is described as a computer system in the aforementioned exemplary embodiments, FIG. 3 is a schematic diagram of a host system and a memory storage device drawn according to another exemplary embodiment of the present invention. Refer to FIG. 3, in another exemplary embodiment, the host system 31 may also be a system, such as a digital camera, a video camera, a communication device, an audio player, a video player or a tablet computer, while the memory storage device 30 may be various non-volatile memory storage devices used by the host system 31, such as a secure digital (SD) card 32, a compact flash (CF) card 33 or an embedded storage device 34. The embedded storage device 34 includes various types of embedded storage devices for directly coupling the memory module to the substrate of the host system, such as an embedded multimedia card (eMMC) 341 and/or an embedded multi-chip package (eMCP) storage device 342.

Figure 4:
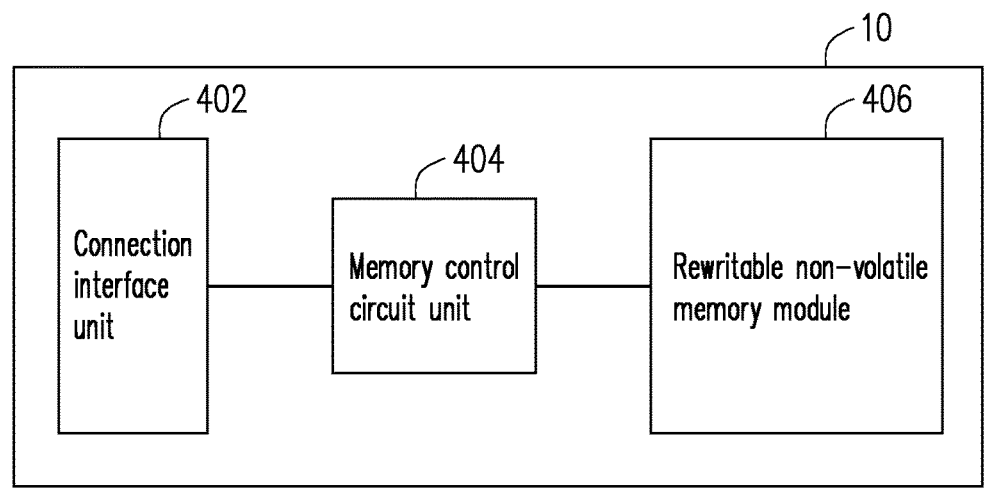
FIG. 4 is a schematic block diagram of a memory storage device drawn according to an exemplary embodiment of the present invention.

FIG. 4 is a schematic block diagram of a memory storage device drawn according to an exemplary embodiment of the present invention.

Refer to FIG. 4, the memory storage device 10 comprises a connecting interface unit 402, a memory control circuit unit 404 and a rewritable non-volatile memory module 406.

The connecting interface unit 402 is configured to couple the memory storage device 10 to the host system 11. In the present exemplary embodiment, the connecting interface unit 402 meets the Peripheral Component Interconnect Express (PCI Express) standard, and is compatible with the fast Non-volatile Memory (NVM express) interface standard. Specifically, as a protocol of communication between the host system and the memory device, the fast Non-volatile Memory interface standard defines a register interface, an instruction set and a function set between the controller of the memory storage device and an operating system of the host system, and increases the data access speed and data transmission rate of the memory storage device featuring a PCIe interface by optimizing the interface standard of the memory storage device. However, in another exemplary embodiment, the connecting interface unit 402 may also meet other suitable standards. In addition, the connecting interface unit 402 and the memory control circuit unit 404 may be packaged in a chip, or the connecting interface unit 402 is arranged outside a chip comprising the memory control circuit unit 404.

The memory control circuit unit 404 is configured to execute a plurality of logic gates or control instructions implemented in the form of hardware or firmware and perform write, read, erase and other operations for data in the rewritable non-volatile memory module 406 according to the instruction of the host system 11.

The rewritable non-volatile memory module 406 is coupled to the memory control circuit unit 404 and configured to store data written by the host system 11. The rewritable non-volatile memory module 406 may be a Single Level Cell (SLC) NAND type flash memory module (i.e. a flash memory module capable of storing a bit in a cell), a Multi Level Cell (MLC) NAND flash memory module (i.e. a flash memory module capable of storing two bits in a cell), a Triple Level Cell (TLC) NAND flash memory module (i.e. a flash memory module capable of storing three bits in a cell), other flash memory modules or other memory modules with the same characteristics.

Each cell in the rewritable non-volatile memory module 406 stores one or more bits through the change of voltage (also called critical voltage below). Specifically, a charge trapping layer is arranged between the control gate of each cell and a channel. By applying a write voltage to the control gate, the electron quantity of the charge trapping layer can be changed, so that the critical voltage of the cell is changed. The operation of changing the critical voltage of the cell is also called "writing data into the cell" or "programming the cell". With the change of the critical voltage, each cell in the rewritable non-volatile memory module 406 has a plurality of storage states. By applying a read voltage, which storage state a cell is in can be judged, and thereby one or more bits stored in the cell can be obtained.

In the present exemplary embodiment, the cells of the rewritable non-volatile memory module 406 may form a plurality of physical programming units, and moreover, these physical programming units may form a plurality of physical erasing units. Specifically, cells on the same word line may form one or more physical programming units. If each cell can store two or more bits, then the physical programming units on the same work line may be at least classified into lower physical programming units and upper physical programming units. For example, the least significant bit (LSB) of a cell belongs to a lower physical programming unit, and moreover, the most significant bit (MSB) of a cell belongs to an upper physical programming unit. In general, in an MLC NAND flash memory, the write speed of the lower physical programming unit is higher than the write speed of the upper physical programming unit, and/or the reliability of the lower physical programming unit is higher than the reliability of the upper physical programming unit.

In the present exemplary embodiment, the physical programming unit is a programmed smallest unit. That is, the physical programming unit is a smallest unit into which data is written. For example, the physical programming units are physical pages or physical sectors. If the physical programming units are physical pages, then these physical programming units generally include data bit areas and redundancy bit areas. The data bit area comprises a plurality of physical sectors, which are configured to store data of a user, while the redundancy bit area is configured to store system data (for example, error-correcting codes and other management data). In the present exemplary embodiment, the data bit area comprises 32 physical sectors, and the size of each physical sector is 512 bytes (B). However, in other exemplary embodiments, the data bit area may also comprise 8, 16 or more or less physical sectors, and moreover, the size of each physical sector may also be larger or smaller. In another aspect, the physical erasing unit is a smallest unit for erasing. That is, each physical erasing unit contains one of the smallest numbers of erased cells. For example, the physical erasing unit is a physical block.

Figure 5:
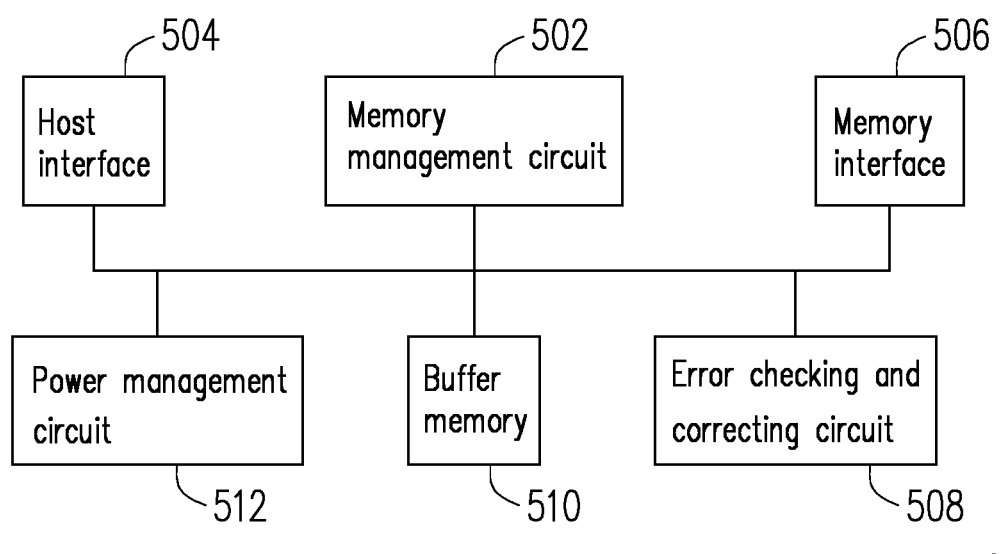
FIG. 5 is a schematic block diagram of a memory control circuit unit drawn according to an exemplary embodiment of the present invention.

FIG. 5 is a schematic block diagram of a memory control circuit unit drawn according to an exemplary embodiment of the present invention.

Refer to FIG. 5, the memory control circuit unit 404 includes a memory management circuit 502, a host interface 504 and a memory interface 506.

The memory management circuit 502 is configured to control the overall operation of the memory control circuit unit 404. Specifically, the memory management circuit 502 has a plurality of control instructions, and moreover, when the memory storage device 10 operates, these control instructions will be executed to perform write, read, erase and other operations for data. The following description of the operation of the memory management circuit 502 is equivalent to the description of the operation of the memory control circuit unit 404.

In the present exemplary embodiment, the control instructions of the memory management circuit 502 are implemented in the form of firmware. For example, the memory management circuit 502 is provided with a microprocessor unit (not shown) and a read only memory (not shown), and moreover, these control instructions are burnt into the read only memory. When the memory storage device 10 operates, these control instructions will be executed by the microprocessor unit to perform write, read, erase and other operations for data.

In another exemplary embodiment, the control instructions of the memory management circuit 502 may also be stored in the form of program codes in a specific area of the rewritable non-volatile memory module 406 (for example, a system area exclusively used to store system data in the memory module). In addition, the memory management circuit 502 is provided with a microprocessor unit (not shown), a read only memory (not shown) and a random access memory (not shown). In particular, the read only memory has boot codes, and moreover, when the memory control circuit unit 404 is enabled, the microprocessor unit will execute the boot codes first to load the control instructions stored in the rewritable non-volatile memory module 406 into the random access memory of the memory management circuit 502. Subsequently, the microprocessor unit will run these control instructions to perform write, read, erase and other operations for data.

In addition, in another exemplary embodiment, the control instructions of the memory management circuit 502 may also be implemented in the form of hardware. For example, the memory management circuit 502 comprises a microcontroller, a cell management circuit, a memory writing circuit, a memory reading circuit, a memory erasing circuit and a data processing circuit. The cell management circuit, the memory writing circuit, the memory reading circuit, the memory erasing circuit and the data processing circuit are coupled to the microcontroller. The cell management circuit is configured to manage the cells or cell group of the rewritable non-volatile memory module 406. The memory writing circuit is configured to issue a write instruction sequence to the rewritable non-volatile memory module 406 to write data into the rewritable non-volatile memory module 406. The memory reading circuit is configured to issue a read instruction sequence to the rewritable non-volatile memory module 406 to read the data from the rewritable non-volatile memory module 406. The memory erasing circuit is configured to issue an erase instruction sequence to the rewritable non-volatile memory module 406 to erase the data from the rewritable non-volatile memory module 406. The data processing circuit is configured to process data to be written into the rewritable non-volatile memory module 406 and data read from the rewritable non-volatile memory module 406. The write instruction sequence, the read instruction sequence and the erase instruction sequence may respectively include one or more program codes or instruction codes and are used to instruct the rewritable non-volatile memory module 406 to perform corresponding write, read, erase and other operations. In an exemplary embodiment, the memory management circuit 502 may also issue other types of instruction sequences to the rewritable non-volatile memory module 406 to indicate the performing of corresponding operations.

The host interface 504 is coupled to the memory management circuit 502 and configured to receive and identify instructions and data transmitted by the host system 11. That is, instructions and data transmitted by the host system 11 will be transmitted to the memory management circuit 502 via the host interface 504. In the present exemplary embodiment, the host interface 504 is compatible with the SATA standard. However, it is to be understood that the present invention is not limited to this, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard or other suitable data transmission standards.

The memory interface 506 is coupled to the memory management circuit 502 and configured to access the rewritable non-volatile memory module 406. That is, data to be written into the rewritable non-volatile memory module 406 will be converted into a format acceptable to the rewritable non-volatile memory module 406 by the memory interface 506. Specifically, if the memory management circuit 502 needs to access the rewritable non-volatile memory module 406, the memory interface 506 will transmit a corresponding instruction sequence. For example, these instruction sequences may include a write instruction sequence for indicating data writing, a read instruction sequence for indicating data reading, an erase instruction sequence for indicating data erasing and corresponding instruction sequences for indicating various memory operations (such as changing read voltage level, performing garbage collection operation, etc.). For example, these instruction sequences are generated by the memory management circuit 502, and are transmitted to the rewritable non-volatile memory module 406 via the memory interface 506. These instruction sequences may include one or more signals or data on the bus. These signals or data may include instruction codes or program codes. For example, the read instruction sequence may include data, such as a read identification code, and a memory address.

In an exemplary embodiment, the memory control circuit unit 404 further comprises an error check and correction circuit 508, a buffer memory 510 and a power management circuit 512.

The error check and correction circuit 508 is coupled to the memory management circuit 502 and configured to perform an error detection and correction operation to ensure the correctness of data. Specifically, when the memory management circuit 502 receives a write instruction from the host system 11, the error detection and correction circuit 508 will generate a corresponding error correcting code (ECC) and/or error detecting code (EDC) for data corresponding to the write instruction, and moreover, the memory management circuit 502 will write the data corresponding to the write instruction and the corresponding error correcting code and/or error detecting code into the rewritable non-volatile memory module 406. Subsequently, when reading the data from the rewritable non-volatile memory module 406, the memory management circuit 502 will read the error correcting code and/or the error detecting code corresponding to the data at the same time, and moreover, the error detection and correction circuit 508 will perform an error detection and correction operation for the read data according to the error correcting code and/or the error detecting code.

The buffer memory 510 is coupled to the memory management circuit 502 and configured to temporarily store data and instructions coming from the host system 11 or data coming from the rewritable non-volatile memory module 406. The power management circuit 512 is coupled to the memory management circuit 502 and configured to control the power of the memory storage device 10.

It is noted that in the following description, some terms may be replaced with corresponding abbreviations for ease of reading (see Table 1).

TABLE 1

| | |
|---|---|
| rewritable non-volatile memory module | RNVM module |
| physical erasing unit | PEU |
| physical programming unit | PPU |
| memory management circuit | MMC |

Figure 6:
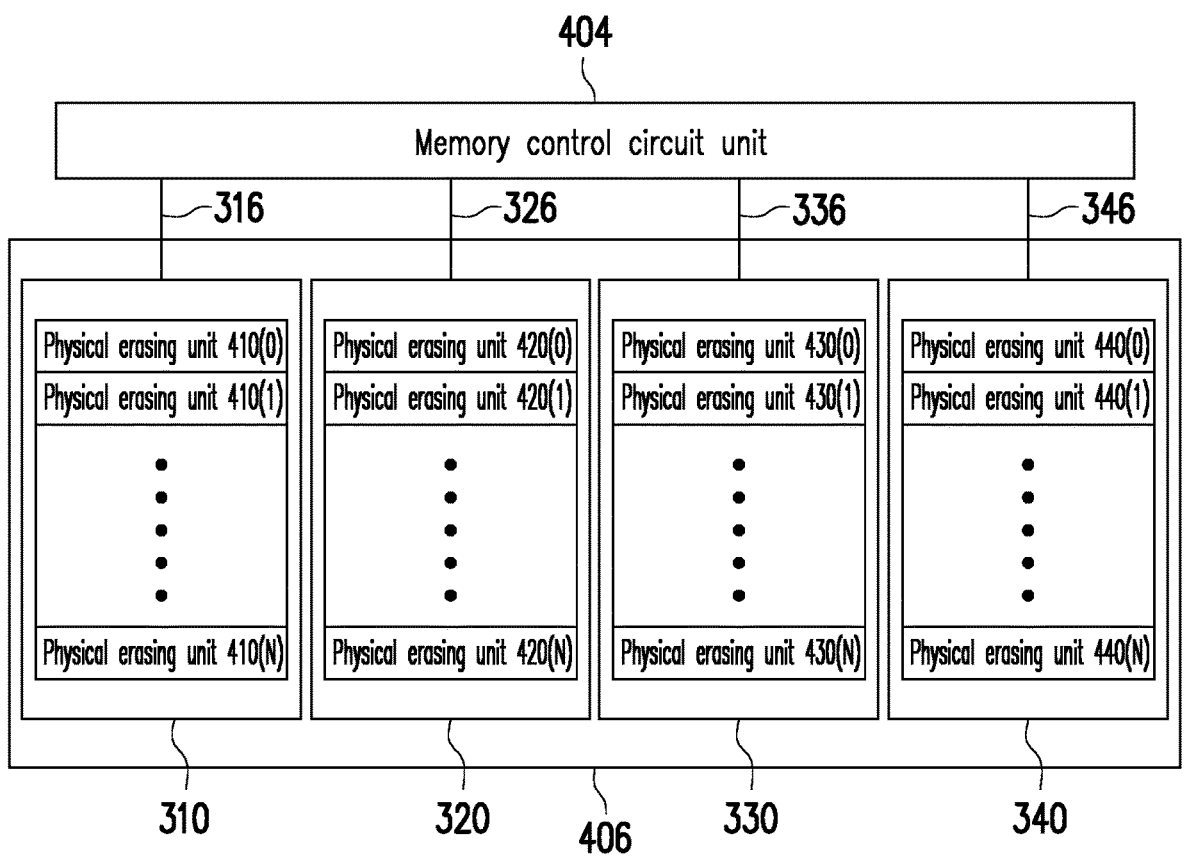
FIG. 6 is a schematic block diagram of a rewritable non-volatile memory module drawn according to exemplary Embodiment 1 of the present invention.

FIG. 6 is a schematic block diagram of a RNVM module drawn according to exemplary Embodiment 1 of the present invention.

Refer to FIG. 6, the RNVM module 406 includes a first memory sub-module 310, a second memory sub-module 320, a third memory sub-module 330 and a fourth memory sub-module 340. For example, the first memory sub-module 310, the second memory sub-module 320, the third memory sub-module 330 and the fourth memory sub-module 340 are respectively memory dies. The first memory sub-module 310 is provided with PEUs 410 (0) to 410 (N). The second memory sub-module 320 is provided with PEUs 420 (0) to 420 (N). The third memory sub-module 330 is provided with PEUs 430 (0) to 430 (N). The fourth memory sub-module 340 is provided with PEUs 440 (0) to 440 (N).

For example, the first memory sub-module 310, the second memory sub-module 320, the third memory sub-module 330 and the fourth memory sub-module 340 are respectively coupled to the memory control circuit unit 404 through separate data buses 316, 326, 336 and 346. On this basis, the MMC 502 may write data into the first memory sub-module 310, the second memory sub-module 320, the third memory sub-module 330 and the fourth memory sub-module 340 via the data buses 316, 326, 336 and 346 in parallel.

For example, it is to be understood that in another exemplary embodiment of the present invention, the first memory sub-module 310, the second memory sub-module 320, the third memory sub-module 330 and the fourth memory sub-module 340 may also be coupled to the memory control circuit unit 404 through only one data bus. Here, the MMC 502 may write data into the first memory sub-module 310, the second memory sub-module 320, the third memory sub-module 330 and the fourth memory sub-module 340 via a single data bus in an interleaving manner.

In particular, the first memory sub-module 310, the second memory sub-module 320, the third memory sub-module 330 and the fourth memory sub-module 340 may respectively include a plurality of word lines, a plurality of cells on the same word line may form a plurality of physical pages, and the plurality of physical pages on the same word line may be called a physical page group. Each PEU of the first memory sub-module 310, the second memory sub-module 320, the third memory sub-module 330 and the fourth memory sub-module 340 is provided with a plurality of physical pages, wherein data can be separately written into and simultaneously erased from the physical pages belonging to the same PEU. For example, each PEU consists of 128 physical pages. However, it is to be understood that the present invention is not limited thereto, and each PEU may consist of 64 physical pages, 256 physical pages or any other numbers of physical pages.

More specifically, the PEU is a smallest unit for erasing. That is, each PEU contains the smallest numbers of cells that are erased together. The physical page is a programmed smallest unit. That is, the physical page is a smallest unit into which data is written. However, it is to be understood that in another exemplary embodiment of the present invention, the smallest unit into which data are written may also be a sector or other sizes. Each physical page generally includes a data bit area and a redundancy bit area. The data bit area is configured to store data of a user, while the redundancy bit area is configured to store system data (for example, error detection and correction codes). It is to be noted that in another exemplary embodiment, a PEU may also refer to a physical address, a PPU or consist of a plurality of continuous or discontinuous physical addresses.

It is worth mentioning that although the exemplary embodiment of the present invention is described with the RNVM module 406 including four memory sub-modules as an example, The present invention is not limited thereto, and in other embodiments, the RNVM module 406 may also include six, eight or ten memory sub-modules.

Here, a plurality of PEUs which are simultaneously used for parallel write may be called a "PEU group". In the present embodiment, the plurality of PEUs in a PEU group respectively belong to different memory sub-modules, and moreover, data can be simultaneously written via data buses. Taking a PEU group composed of a PEU 410 (1), a PEU 420 (1), a PEU 430 (1) and a PEU 440 (1) as an example, the MMC 502 may write data into the PEU 410 (1), the PEU 420 (1), the PEU 430 (1) and the PEU 440 (1) via the data buses 316, 326, 336 and 346 in parallel. The PEU 410 (1), the PEU 420 (1), the PEU 430 (1) and the PEU 440 (1) are respectively located in different memory sub-modules. For another example, taking a PEU group composed of a PEU 410 (0), a PEU 420 (0), a PEU 430 (0) and a PEU 440 (0) as an example, the MMC 502 may write data into the PEU 410 (0), the PEU 420 (0), the PEU 430 (0) and the PEU 440 (0) via the data buses 316, 326, 336 and 346 in parallel. The PEU 410 (0), the PEU 420 (0), the PEU 430 (0) and the PEU 440 (0) are respectively located in different memory sub-modules.

In particular, in the present embodiment, in order to facilitate management, the plurality of PEUs in the same PEU group correspond to the same index code in a logic address-physical address mapping table, and different PEU groups correspond to different index codes. For example, taking the PEU group composed of the PEU 410 (0), the PEU 420 (0), the PEU 430 (0) and the PEU 440 (0) as an example, the PEU 410 (0), the PEU 420 (0), the PEU 430 (0) and the PEU 440 (0) correspond to the same index code in the logic address-physical address mapping table, and the value of the index code is, for example, "001". For another example, taking the PEU group composed of the PEU 410 (1), the PEU 420 (1), the PEU 430 (1) and the PEU 440 (1) as an example, the PEU 410 (1), the PEU 420 (1), the PEU 430 (1) and the PEU 440 (1) correspond to the same index code in the logic address-physical address mapping table, and the value of the index code is, for example, "002". The other PEU groups also have the similar phenomenon, and the descriptions thereof are omitted here.

It is to be noted that in general, in order to increase the efficiency of write, the MMC 502 may generally write data into the first memory sub-module 310, the second memory sub-module 320, the third memory sub-module 330 and the fourth memory sub-module 340 via the data buses 316, 326, 336 and 346 in parallel. For example, the MMC 502 may write data into the PEU group composed of the PEU 410 (1), the PEU 420 (1), the PEU 430 (1) and the PEU 440 (1) via the data buses 316, 326, 336 and 346 in parallel. In the process of parallel write, if the quantity of data to be written is just equal to the capacity to store data of a PEU group (i.e. the capacity to store data of four PEUs), the PEU 410 (1), the PEU 420 (1), the PEU 430 (1) and the PEU 440 (1) will generally be filled up with the data simultaneously at a certain time point.

If the MMC 502 needs to subsequently perform an erase operation for the PEU group composed of the PEU 410 (1), the PEU 420 (1), the PEU 430 (1) and the PEU 440 (1) (for example, perform valid data merging or other operations) for some reason, the MMC 502 will generally perform the erase operation for the PEU 410 (1), the PEU 420 (1), the PEU 430 (1) and the PEU 440 (1) simultaneously. That is, in the prior art, in order to keep the efficiency of parallel write, erase operation is generally performed with a PEU group as a unit to clear the space of the PEU group for subsequent parallel write.

In this case, because all the four memory sub-modules in the rewritable non-volatile memory 406 are used to perform the erase operation, if the host system 11 issues a plurality of write instructions in succession at this moment, then data coming from the host system 11 cannot be written into the rewritable non-volatile memory 406 but need to be temporarily stored into the buffer memory 510. However, because of the limited space of the buffer memory 510, the longer the execution time of the erase operation is, under the condition of the host system 11 issuing write instructions in succession, the larger capacity the buffer memory 510 is required to have in order to temporarily store data coming from the host system 11. Therefore, how to prevent all the memory sub-modules in the rewritable non-volatile memory 406 from being simultaneously used to execute the erase operation is one of the problems which those skilled in the art want to solve.

Figure 7:
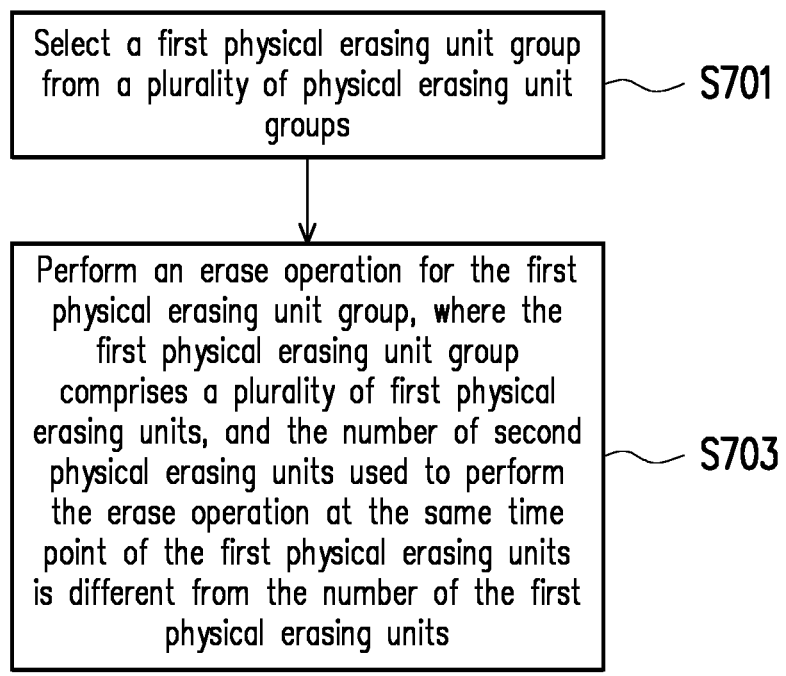
FIG. 7 is a flow diagram of a data erasing method drawn according to an exemplary embodiment of the present invention.

FIG. 7 is a flow diagram of a data erasing method drawn according to an exemplary embodiment of the present invention.

Refer to FIG. 7, if an erase operation needs to be performed, in step S701, the MMC 502 selects a PEU group (also called a first PEU group) from the plurality of PEU groups in the rewritable non-volatile memory 406. Subsequently, in step S703, the MMC 502 performs the erase operation for the aforementioned first PEU group. In particular, the first PEU group includes a plurality of PEUs (also called first PEUs), and the number of at least one PEU (also called a second PEU) used to perform the erase operation at the same time point of the first PEUs is different from the number of the first PEUs.

It is to be noted that in the present embodiment, as the plurality of PEUs of a PEU group respectively belong to different memory sub-modules and, in the data erasing method of the present invention, as an erase operation will not be performed for all the PEUs in one PEU group at the same time point, not all the memory sub-modules are used to perform the erase operation at the same time point. In this case, when the host system 11 still continues to issue write instructions, data coming from the host system 11 can be written into the RNVM module 406 instead of being temporarily stored in the buffer memory 510 to wait for the completion of the erase operation. Thereby, the data erasing method of the present invention does not need to use a buffer memory 510 with large capacity, and avoids the problem caused by all the memory sub-modules in the rewritable non-volatile memory 406 being simultaneously used to perform an erase operation.

The data erasing method of the present invention will be described below in reference to a plurality of embodiments.

Embodiment 1

FIG. 8A, FIG. 8B, FIG. 9A, FIG. 9B, FIG. 10A, FIG. 10B, FIG. 11A, FIG. 11B, FIG. 12A and FIG. 12B are schematic diagrams of an example of a data erasing method drawn according to exemplary Embodiment 1 of the present invention.

First of all, refer to FIG. 8A and FIG. 8B, here, the PEU group composed of the PEU 410 (1), the PEU 420 (1), the PEU 430 (1) and the PEU 440 (1) is called a "first PEU group", and the plurality of PEUs belonging to the first PEU group may be called "first PEUs". In addition, here, the PEU group composed of the PEU 410 (0), the PEU 420 (0), the PEU 430 (0) and the PEU 440 (0) is called a "second PEU group", and the plurality of PEUs belonging to the second PEU group may be called "third PEUs".

In the initial state of Embodiment 1, no data is stored in the PEU 410 (0), PEU 420 (0), PEU 430 (0) and PEU 440 (0) of the second PEU group, while data OD1-OD16 is stored in the PEU 410 (1), PEU 420 (1), PEU 430 (1) and PEU 440 (1) of the first PEU group. As shown in FIG. 8B, the $1^{st}$ PPU, $2^{nd}$ PPU, $3^{rd}$ PPU and $4^{th}$ PPU of the PEU 410 (1) respectively store the data OD1, the data OD5, the data OD9 and the data OD13. The $1^{st}$ PPU, $2^{nd}$ PPU, $3^{rd}$ PPU and $4^{th}$ PPU of the PEU 420 (1) respectively store the data OD2, the data OD6, the data OD10 and the data OD14. The $1^{st}$ PPU, $2^{nd}$ PPU, $3^{rd}$ PPU and $4^{th}$ PPU of the PEU 430 (1) respectively store the data OD3, the data OD7, the data OD11 and the data OD15. The $1^{st}$ PPU $2^{nd}$ PPU, $3^{rd}$ PPU and $4^{th}$ PPU of the PEU 440 (1) respectively store the data OD4, the data OD8, the data OD12 and the data OD16.

As the PEU 410 (1), the PEU 420 (1), the PEU 430 (1) and the PEU 440 (1) have already stored the data OD1-0D16, if the MMC 502 needs to perform an erase operation for the PEU 410 (1), the PEU 420 (1), the PEU 430 (1) and the PEU 440 (1) for some reason, in the present embodiment, the erase operation which the MMC 502 will perform for the aforementioned plurality of PEUs will be scattered into a write operation for performing.

More specifically, refer to both FIG. 9A and FIG. 9B, if the host system 11 subsequently issues a write instruction to write data ND1-ND4 into the rewritable non-volatile memory 10, as no data is stored in the second PEU group, the MMC 502 may select the second PEU group for writing. Subsequently, the MMC 502 can perform a write operation for the second PEU group according to the write instruction issued by the host system 11. For example, the MMC 502 may first write the data ND1-ND4 into the $1^{st}$ PPU of the PEU 410 (0), the $1^{st}$ PPU of the PEU 420 (0), the $1^{st}$ PPU of the PEU 430 (0) and the $1^{st}$ PPU of the PEU 440 (0) of the second PEU group in parallel according to the write instruction issued by the host system 11.

In this case, the MMC 502 will judge whether the quantity of the data stored in the second PEU group has reached a threshold value (also called a first threshold value). In the present example, it is assumed that the first threshold value is one quarter of the capacity to store data of a PEU group, however, the present invention is not intended to define an exact number for the first threshold value.

As the second PEU group in FIG. 9A includes 16 PPUs and 4 PPUs among these PPUs have stored the data ND1-ND4, the MMC 502 will judge that the quantity of the data stored in the second PEU group has reached the first threshold value. In this case, the MMC 502 can perform an erase operation for the PEU 410 (1) (also called a fourth PEU) of the first PEU group, as shown in FIG. 9B.

Subsequently, refer to both FIG. 10A and FIG. 10B, if the host system 11 subsequently issues a write instruction to write data ND5-ND8 into the rewritable non-volatile memory 10, the MMC 502 can perform a write operation for the second PEU group again according to the aforementioned write instruction issued by the host system 11. For example, the MMC 502 may write the data ND5-ND8 into the $2^{nd}$ PPU of the PEU 410 (0), the $2^{nd}$ PPU of the PEU 420 (0), the $2^{nd}$ PPU of the PEU 430 (0) and the $2^{nd}$ PPU of the PEU 440 (0) of the second PEU group in parallel according to the write instruction issued by the host system 11.

In this case, the MMC 502 will judge whether the quantity of the data stored in the second PEU group has reached another threshold value (also called a second threshold value). In the present example, it is assumed that the second threshold value is half of the capacity to store data of a PEU group, however, the present invention is not intended to define an exact number for the second threshold value.

As the second PEU group in FIG. 10A includes 16 PPUs and 8 PPUs among these PPUs have stored the data ND1-ND8, the MMC 502 will judge that the quantity of the data stored in the second PEU group has reached the second threshold value. In this case, the MMC 502 can perform an erase operation for the PEU 420 (1) (also called a fifth PEU) of the first PEU group, as shown in FIG. 10B.

Subsequently, refer to both FIG. 11A and FIG. 11B, if the host system 11 subsequently issues a write instruction to write data ND9-ND12 into the rewritable non-volatile memory 10, the MMC 502 can execute a write operation for the second PEU group again according to the aforementioned write instruction issued by the host system 11. For example, the MMC 502 may write the data ND9-ND12 into the $3^{rd}$ PPU of the PEU 410 (0), the $3^{rd}$ PPU of the PEU 420 (0), the $3^{rd}$ PPU of the PEU 430 (0) and the $3^{rd}$ PPU of the PEU 440 (0) of the second PEU group in parallel according to the write instruction issued by the host system 11.

In this case, the MMC 502 will judge whether the quantity of the data stored in the second PEU group has reached another threshold value (also called a third threshold value). In the present example, it is assumed that the third threshold value is three quarters of the capacity to store data of a PEU group, however, the present invention is not intended to define an exact number for the third threshold value.

As the second PEU group in FIG. 11A includes 16 PPUs and 12 PPUs among these PPUs have stored the data ND1-ND12, the MMC 502 will determine that the quantity of the data stored in the second PEU group has reached the third threshold value. In this case, the MMC 502 can perform an erase operation for the PEU 430 (1) of the first PEU group, as shown in FIG. 11B.

Subsequently, refer to both FIG. 12A and FIG. 12B, if the host system 11 subsequently issues a write instruction to write data ND13-ND16 into the rewritable non-volatile memory 10, the MMC 502 can perform a write operation for the second PEU group again according to the aforementioned write instruction issued by the host system 11. For example, the MMC 502 may write the data ND13-ND16 into the $4^{th}$ PPU of the PEU 410 (0), the $4^{th}$ PPU of the PEU 420 (0), the $4^{th}$ PPU of the PEU 430 (0) and the $4^{th}$ PPU of the PEU 440 (0) of the second PEU group in parallel according to the write instruction issued by the host system 11.

In this case, the MMC 502 will judge whether the quantity of the data stored in the second PEU group has reached another threshold value (also called a fourth threshold value). In the present example, it is assumed that the fourth threshold value is the capacity to store data of a PEU group, however, the present invention is not intended to define an exact number for the fourth threshold value.

As the second PEU group in FIG. 12A includes 16 PPUs and 16 PPUs among these PPUs have stored the data ND1-ND16, the MMC 502 will determine that the quantity of the data stored in the second PEU group has reached the fourth threshold value. In this case, the MMC 502 can perform an erase operation for the PEU 440 (1) of the first PEU group, as shown in FIG. 12B.

In other words, in the data writing method of the present invention, when the quantity of the data stored in the second PEU group has reached the capacity to store data of the second PEU group (i.e., data have been written into all the 16 PPUs of the second PEU group), the data stored in the PEU 410 (1), the PEU 420 (1), the PEU 430 (1) and the PEU 440 (1) of the first PEU group have all been erased. Therefore, after the aforementioned write operation corresponding to the data ND1-ND16 is complete, because the second PEU group will be restored into an idle state, when the host system 11 continues to issue a write instruction, the MMC 502 can directly write data into the second PEU group in parallel.

It is to be noted that here, the $1^{st}$ PPUs in the PEU 410 (0), the PEU 420 (0), the PEU 430 (0) and the PEU 440 (0) can be called "first PPUs", and moreover, the $2^{nd}$ PPUs in the PEU 410 (0), the PEU 420 (0), the PEU 430 (0) and the PEU 440 (0) can be called "second PPUs". In particular, in the process of parallel write, the second PPUs in the PEU 410 (0), the PEU 420 (0), the PEU 430 (0) and the PEU 440 (0) is programmable only after all the first PPUs in the PEU 410 (0), the PEU 420 (0), the PEU 430 (0) and the PEU 440 (0) have been programmed.

In addition, it is assumed that the aforementioned data ND1-ND16 are continuous data. That is, the data of the data ND1-ND16 are data ND1-ND16 in sequence. In the aforementioned example, as the PEU group composed of the PEU 410 (0), the PEU 420 (0), the PEU 430 (0) and the PEU 440 (0) is used for the writing of the continuous data ND1-ND16, a plurality of logic addresses corresponding to the data stored in the PEU 410 (0), the PEU 420 (0), the PEU 430 (0) and the PEU 440 (0) are continuous. For example, the $1^{st}$ PPUs in the PEU 410 (0), the PEU 420 (0), the PEU 430 (0) and the PEU 440 (0) are respectively used to store the data ND1-ND4, while a plurality of logic addresses corresponding to the data ND1-ND4 are continuous.

It is to be noted that in the aforementioned process of writing the continuous data ND1-ND16 into the PEU 410 (0), the PEU 420 (0), the PEU 430 (0) and the PEU 440 (0) in parallel, the data stored in the plurality of PPUs in the same PEU are not continuous. For example, taking the PEU 430 (0) (also called a seventh PEU) as an example, the logic address corresponding to the data ND3 stored in the $1^{st}$ PPU of the PEU 430 (0) and the logic address corresponding to the data ND7 stored in the $2^{nd}$ PPU of the PEU 430 (0) are not continuous. However, in the PEU 430 (0), the $1^{st}$ PPU of the PEU 430 (0) and the $2^{nd}$ PPU of the PEU 430 (0) are continuously arranged in physical. The other PEUs also have the similar phenomenon, and the descriptions thereof are omitted here.

In this way, as the MMC 502 will not perform an erase operation for all the PEUs of one PEU group at the same time point, not all the memory sub-modules are used to execute the erase operation at the same time point. In this way, the problem caused by simultaneously performing an erase operation for all the memory sub-modules in the rewritable non-volatile memory 406 in the prior art can be avoided, and moreover, the capacity of the buffer memory 510 can be effectively reduced.

Embodiment 2

FIG. 13 is a schematic diagram of an example of a data erasing method drawn according to exemplary Embodiment 2 of the present invention. It is to be noted here that in Embodiment 2 of the present invention, the MMC 502 may adjust the sequence of performing a write operation for the plurality of PEUs of one PEU group, and thereby these PEUs will not be filled up with data at the same time. In particular, an erase operation can be performed for the PEUs which have been filled up with data first, and thereby the problem caused by simultaneously performing an erase operation for all the memory sub-modules in the rewritable non-volatile memory 406 in the prior art is avoided.

Specifically, refer to FIG. 13, here, it is assumed that write is performed for the aforementioned first PEU group. If the host system 11 issues a write instruction to write data ID1-ID8 into the rewritable non-volatile memory 406, the MMC 502 may perform a write operation for the first PEU group according to the aforementioned write instruction issued by the host system 11. In particular, different from the parallel write method used in the prior art, in Embodiment 2 of the present invention, the MMC 502 may adjust the sequence of performing a write operation for the plurality of first PEUs of the first erasing unit group. For example, the MMC 502 may obtain a sequence of performing a write operation for the plurality of PEUs of one PEU group according to an algorithm or a lookup table. In particular, the present invention is not intended to limit the sequence of a write operation and the generation and obtainment method of the sequence.

Here, if the sequence of a write operation which is obtained by the MMC 502 according to the algorithm or the lookup table is "the PEU 410 (1), the PEU 420 (1), the PEU 410 (1), the PEU 420 (1), the PEU 430 (1), the PEU 440 (1), the PEU 420 (1) and the PEU 420 (1)", the MMC 502 will perform a write operation for the PEU 410 (1), the PEU 420 (1), the PEU 430 (1) and the PEU 440 (1) according to the write sequence and the aforementioned write instruction. More specifically, the MMC 502 will write the data ID1 into the PEU 410 (1), the data ID2 into the PEU 420 (1), the data ID3 into the PEU 410 (1), the data ID4 into the PEU 420 (1), the data ID5 into the PEU 430 (1), the data ID6 into the PEU 440 (1), the data ID7 into the PEU 420 (1) and the data ID8 into the PEU 420 (1) according to the aforementioned write sequence, and the result is as shown in FIG. 13.

That is, in Embodiment 2 of the present invention, when the storage space of one PEU (for example, the PEU 420 (1)) of one PEU group is full, at least one of the other PEUs of the PEU group still has usable storage spaces. In particular, an erase operation can be performed for the PEUs which have been filled up with data first, and thereby the problem caused by simultaneously performing an erase operation for all the memory sub-modules in the rewritable non-volatile memory 406 in the prior art is avoided.

Base on the above, in the data erasing method, memory control circuit unit and memory storage device of the present invention, as the erase operation will not be performed for all the PEUs of one PEU group at the same time point, not all the memory sub-modules are used to execute the erase operation at the same time point. In this case, when the host system still continues to issue write instructions, data coming from the host system can be written into the RNVM module instead of being temporarily stored in the buffer memory to wait for the completion of the erase operation. Thereby, the data erasing method of the present invention does not need to use a buffer memory with large capacity, and avoids the problem caused by all the memory sub-modules in the rewritable non-volatile memory being simultaneously used to perform an erase operation.

Although the present invention has been disclosed as above with the embodiments, the embodiments are not intended to limit the present invention. Any person having ordinary skill in the art can make some changes and embellishments without departing from the spirit and scope of the present invention, so the protection scope of the present invention is defined by the appended patent claims.

What is claimed is:
1. A data erasing method, applied to a rewritable non-volatile memory module, wherein the rewritable non-volatile memory module comprises a plurality of physical erasing unit groups, each of the plurality of physical erasing unit groups is provided with a plurality of physical erasing units, and the data erasing method comprises:
  selecting a first physical erasing unit group from the plurality of physical erasing unit groups; and
  performing an erase operation for the first physical erasing unit group, wherein the first physical erasing unit group comprises a plurality of first physical erasing units, and the number of at least one second physical erasing unit used to perform the erase operation at the same time point of the plurality of first physical erasing units is different from the number of the plurality of first physical erasing units,
  performing a write operation for a second physical erasing unit group of the plurality of physical erasing unit groups according to at least one write instruction, wherein the second physical erasing unit group comprises a plurality of third physical erasing units;
  when a quantity of data stored in the second physical erasing unit group reaches a first threshold value, performing the step of erase operation for the first physical erasing unit group to perform the erase operation for a fourth physical erasing unit of the plurality of first physical erasing units; and
  when the quantity of data stored in the second physical erasing unit group reaches a second threshold value, performing the step of erase operation for the first physical erasing unit group to perform the erase operation for a fifth physical erasing unit of the plurality of first physical erasing units,
  wherein the first threshold value is less than the second threshold value.

2. The data erasing method according to claim 1, wherein the rewritable non-volatile memory module comprises a plurality of memory sub-modules, the plurality of memory sub-modules are respectively connected to a memory control circuit unit via a plurality of channels, and the plurality of physical erasing units of each of the plurality of physical erasing unit groups respectively belong to different memory sub-modules of the plurality of memory sub-modules.

3. The data erasing method according to claim 2, wherein the memory control circuit unit performs the write operation for the plurality of third physical erasing units of the second physical erasing unit group via the plurality of channels to write a plurality of data into the plurality of third physical erasing units in parallel.

4. The data erasing method according to claim 1, wherein before the erase operation is performed for the first physical erasing unit group, the method further comprises:
  adjusting a sequence of performing a write operation for the plurality of first physical erasing units; and
  performing the write operation for the plurality of first physical erasing units according to the write sequence and a write instruction, so that at least one sixth physical erasing unit of the plurality of first physical erasing units still comprises usable storage space when the storage space of the second physical erasing unit is full.

5. The data erasing method according to claim 1, wherein in the plurality of physical erasing unit groups, the plurality of physical erasing units in the same physical erasing unit group correspond to the same index code in a logic address-physical address mapping table.

6. The data erasing method according to claim 1, wherein each of the plurality of first physical erasing units of the first physical erasing unit group comprises a first physical programming unit and a second physical programming unit, and the second physical programming unit of each of the plurality of first physical erasing units is programmable only after the first physical programming unit of each of the plurality of first physical erasing units is programmed.

7. The data erasing method according to claim 1, wherein each of the plurality of first physical erasing units of the first physical erasing unit group comprises a first physical programming unit, and when continuous data is written into the first physical erasing unit group, a plurality of logic addresses corresponding to the plurality of data stored in the first physical programming unit of the first physical erasing unit of the first physical erasing unit group are continuous.

8. The data erasing method according to claim 1, wherein each of the plurality of first physical erasing units of the first physical erasing unit group comprises a first physical programming unit and a second physical programming unit, when continuous data is written into the first physical erasing unit group, a logic address corresponding to the data stored in the first physical programming unit of a seventh physical erasing unit of the first physical erasing unit group and a logic address corresponding to the data stored in the second physical programming unit of the seventh physical erasing unit are not continuous, and the first physical programming unit and the second physical programming unit of the seventh physical erasing unit are continuously arranged in physical.

9. A memory control circuit unit, configured to control a rewritable non-volatile memory module, wherein the rewritable non-volatile memory module comprises a plurality of physical erasing unit groups, each of the plurality of physical erasing unit groups is provided with a plurality of physical erasing units, and the memory control circuit unit comprises:

a host interface, configured to be coupled to a host system;

a memory interface, configured to be coupled to the rewritable non-volatile memory module; and a memory management circuit, coupled to the host interface and the memory interface, wherein the memory management circuit s configured to select a first physical erasing unit group from the plurality of physical erasing unit groups, wherein the memory management circuit is further configured to perform an erase operation for the first physical erasing unit group, wherein the first physical erasing unit group comprises a plurality of first physical erasing units, and the number of at least one second physical erasing unit used to perform the erase operation at the same time point of the plurality of first physical erasing units is different from the number of the plurality of first physical erasing units, wherein the memory management circuit is further configured to perform a write operation for a second physical erasing unit group of the plurality of physical erasing unit groups according to at least one write instruction, wherein the second physical erasing unit group comprises a plurality of third physical erasing units;

when a quantity of data stored in the second physical erasing unit group reaches a first threshold value, the memory management circuit is further configured to perform the erase operation for the first physical erasing unit group to perform the erase operation for a fourth physical erasing unit of the plurality of first physical erasing units;

when the quantity of data stored in the second physical erasing unit group reaches a second threshold value, the memory management circuit is further configured to perform the erase operation for the first physical erasing unit group to perform the erase operation for a fifth physical erasing unit of the plurality of first physical erasing units, wherein the first threshold value is less than the second threshold value.

10. The memory control circuit unit according to claim 9, wherein the rewritable non-volatile memory module comprises a plurality of memory sub-modules, the plurality of memory sub-modules are respectively connected to the memory management circuit via a plurality of channels, and the plurality of physical erasing units of each of the plurality of physical erasing unit groups respectively belong to different memory sub-modules of the plurality of memory sub-modules.

11. The memory control circuit unit according to claim 10, wherein the memory management circuit performs the write operation for the plurality of third physical erasing units of the second physical erasing unit group via the plurality of channels to write a plurality of data into the plurality of third physical erasing units in parallel.

12. The memory control circuit unit according to claim 9, wherein before the erase operation is performed for the first physical erasing unit group, the memory management circuit is further configured to adjust a sequence of performing a write operation for the plurality of first physical erasing units, and the memory management circuit is further configured to perform the write operation for the plurality of first physical erasing units according to the write sequence and a write instruction, so that at least one sixth physical erasing unit of the plurality of first physical erasing units still comprises usable storage space when the storage space of the second physical erasing unit is full.

13. The memory control circuit unit according to claim 9, wherein in the plurality of physical erasing unit groups, the plurality of physical erasing units in the same physical erasing unit group correspond to the same index code in a logic address-physical address mapping table.

14. The memory control circuit unit according to claim 9, wherein each of the plurality of first physical erasing units in the first physical erasing unit group comprises a first physical programming unit and a second physical programming unit, and the second physical programming unit of each of the plurality of first physical erasing units is programmable only after the first physical programming unit of each of the plurality of first physical erasing units has been programmed.

15. The memory control circuit unit according to claim 9, wherein each of the plurality of first physical erasing units of the first physical erasing unit group comprises a first physical programming unit, and when continuous data is written into the first physical erasing unit group, a plurality of logic addresses corresponding to the plurality of data stored in the first physical programming unit of the first physical erasing unit of the first physical erasing unit group are continuous.

16. The memory control circuit unit according to claim 9, wherein each of the plurality of first physical erasing units in the first physical erasing unit group comprises a first physical programming unit and a second physical programming unit, when continuous data is written into the first physical erasing unit group, a logic address corresponding to the data stored in the first physical programming unit of a seventh physical erasing unit of the first physical erasing unit group and a logic address corresponding to the data stored in the second physical programming unit of the seventh physical erasing unit are not continuous, and the first physical programming unit and the second physical programming unit of the seventh physical erasing unit are continuously arranged in physical.

17. A memory storage device, comprising:

a connecting interface unit, configured to be coupled to a host system;

a rewritable non-volatile memory module, comprising a plurality of physical erasing unit groups, wherein each of the plurality of physical erasing unit groups is provided with a plurality of physical erasing units; and a memory control circuit unit, coupled to the connecting interface unit and the rewritable non-volatile memory module, wherein the memory control circuit unit is configured to select a first physical erasing unit group from the plurality of physical erasing unit groups, wherein the memory control circuit unit is further configured to perform an erase operation for the first physical erasing unit group, wherein the first physical erasing unit group comprises a plurality of first physical erasing units, and the number of at least one second physical erasing unit used to perform the erase operation at the same time point of the plurality of first physical erasing units is different from the number of the plurality of first physical erasing units, wherein the memory control circuit unit is further configured to perform a write operation for a second physical erasing unit group of the plurality of physical erasing unit groups according to at least one write instruction, wherein the second physical erasing unit group includes a plurality of third physical erasing units;

when a quantity of data stored in the second physical erasing unit group reaches a first threshold value, the memory control circuit unit is further configured to perform the step of erase operation for the first physical erasing unit group to perform the erase operation for a fourth physical erasing unit of the plurality of first physical erasing units;

when the quantity of data stored in the second physical erasing unit group reaches a second threshold value, the memory control circuit unit is further configured to perform the step of erase operation for the first physical erasing unit group to perform the erase operation for a fifth physical erasing unit of the plurality of first physical erasing units, wherein the first threshold value is less than the second threshold value.

18. The memory storage device according to claim 17, wherein the rewritable non-volatile memory module comprises a plurality of memory sub-modules, the plurality of memory sub-modules are respectively connected to a memory control circuit unit through a plurality of channels, and the plurality of physical erasing units of each of the plurality of physical erasing unit groups respectively belong to different memory sub-modules of the plurality of memory sub-modules.

19. The memory storage device according to claim 18, wherein the memory control circuit unit performs the write operation for the plurality of third physical erasing units of the second physical erasing unit group via the plurality of channels to write a plurality of data into the plurality of third physical erasing units in parallel.

20. The memory storage device according to claim 17, wherein before the erase operation is performed for the first physical erasing unit group, the memory control circuit unit is further configured to adjust a sequence of performing a write operation for the plurality of first physical erasing units, and the memory control circuit unit is further configured to perform the write operation for the plurality of first physical erasing units according to the write sequence and a write instruction, so that at least one sixth physical erasing unit of the plurality of first physical erasing units still has usable storage space when the storage space of the second physical erasing unit is full.

21. The memory storage device according to claim 17, wherein in the plurality of physical erasing unit groups, the plurality of physical erasing units in the same physical erasing unit group correspond to the same index code in a logic address-physical address mapping table.

22. The memory storage device according to claim 17, wherein each of the plurality of first physical erasing units in the first physical erasing unit group comprises a first physical programming unit and a second physical programming unit, and the second physical programming unit of each of the plurality of first physical erasing units is programmable only after the first physical programming unit of each of the plurality of first physical erasing units has been programmed.

23. The memory storage device according to claim 17, wherein each of the plurality of first physical erasing units of the first physical erasing unit group comprises a first physical programming unit, and when continuous data is written into the first physical erasing unit group, a plurality of logic addresses corresponding to the plurality of data stored in the first physical programming unit of the first physical erasing unit of the first physical erasing unit group are continuous.

24. The memory storage device according to claim 17, wherein each of the plurality of first physical erasing units of the first physical erasing unit group comprises a first physical programming unit and a second physical programming unit, and when continuous data is written into the first physical erasing unit group, a logic address corresponding to the data stored in the first physical programming unit of a seventh physical erasing unit of the first physical erasing unit group and a logic address corresponding to the data stored in the second physical programming unit of the seventh physical erasing unit are not continuous, and the first physical programming unit and the second physical programming unit of the seventh physical erasing unit are continuously arranged in physical.

\* \* \* \* \*